UNITED STATES PATENT OFFICE.

GUSTAV HERMANN ROEDER, OF PHILADELPHIA, PENNSYLVANIA; CHRISTIANA K. ROEDER, ADMINISTRATRIX OF SAID GUSTAV HERMANN ROEDER, DECEASED; SAID ADMINISTRATRIX ASSIGNOR TO ERNEST F. GREEFF AND ALBERT TILT, OF NEW YORK, N. Y., AND CHARLES C. ROSSIRE, OF YONKERS, NEW YORK.

PROCESS OF OBTAINING CAOUTCHOUC FROM PLANTS BELONGING TO THE NETTLE FAMILY.

No. 795,860. Specification of Letters Patent. Patented Aug. 1, 1905.

Application filed August 6, 1903. Renewed December 17, 1904. Serial No. 237,295.

*To all whom it may concern:*

Be it known that I, GUSTAV HERMANN ROEDER, a citizen of the Republic of Brazil, residing in Philadelphia, in the county of Philadelphia and State of Pennsylvania, have invented certain new and useful Improvements in Processes of Obtaining Caoutchouc from Plants Belonging to the Nettle Family, of which the following is a specification.

This invention relates to a process of obtaining caoutchouc from plants belonging to the nettle family.

It is well known that the *urticaceæ* (*urtica niva*) belong to those plants which yield caoutchouc; but owing to the small quantities of caoutchouc contained therein and the inapplicability of the ordinary method of obtaining caoutchouc to these plants the caoutchouc was hitherto not obtained from the same. In applying the well-known method to these plants the yield obtained from the same would be small and, moreover, impure, so that after purification the quantity of caoutchouc obtained would not be a recompense for the trouble.

This invention comprises the separation of the bark and thin saps from the fibers by suitable mechanical means, such as decortication and squeezing, then the subjection of the fibers from which the bark and thin saps have been separated to the action of a solvent for caoutchouc, and then the separation of the caoutchouc from the solvent. The preliminary decortication of the bark and expulsion of the lighter juices or saps leaves the inspissated juices of caoutchouc in the fibers to be subsequently treated, and in the subsequent treatment the caoutchouc is obtained in a pure state.

In carrying out this process the plants are cut off by machine or by hand after they have grown to a certain height and are then subjected while still in a fresh or green condition to the action of a decorticating-machine, by means of which the leaves, branches, wood of the stalks, and a part of the outer shell are removed, without, however, expressing the juice from the same, so that the fibers, which are between the woody interior and the outer shells and which contain juice or sap and caoutchouc, are free from woody particles. During the subjection of the stalks to the decorticating-machine the small branches, leaves, &c., are gathered, and the small stalks which are not of the proper length are broken by a squeezing-roll, placed in a boiler similar to the kind used in the manufacture of wood-pulp, and then subjected to the action of a concentrated alkali lye, the fiber obtained by this method being used in the manufacture of paper.

The fibers taken from the decorticating-machine are tied in bundles and subjected to the action of squeezing-rolls, the pressure of which is regulated and adjusted in such a manner as to squeeze out the thin saps containing starch, dextrine, or other ingredients, leave the fibers uninjured, and permit the caoutchouc, which is a thick viscous liquid, to remain in the fibers. It is difficult to extract the caoutchouc by pressure, and any pressure which will effect this result will injure the fibers. The expressed sap or juice may be gathered in a basin under the machine and is then treated with a dilute acid or diastase in order to change the starch and dextrine contained therein into glucose, from which after fermentation and distillation alcohol is obtained. The squeezed juice or syrup can, however, be otherwise used, as desired.

The squeezed bundles of fibers which still contain the caoutchouc are placed in water for several days, whereby the caoutchouc swells, because the same is still fresh. Before subjecting the fibers to the process of obtaining the caoutchouc from the same it is desirable and advantageous to separate the fibers completely from the outer shell or bark, as then the caoutchouc will be of better quality; otherwise the juices and outer shell or bark might be dissolved and so brought into solution with the caoutchouc. After the fibers with the bark have remained in the water for some time the outer shell or bark may be removed very much easier than before being placed in water. A complete separation of the fibers without influencing the caoutchouc takes place by means of a squeezing or separating action of rolls, by means of which the fibers are separated from each other. The separated and debarked fibers are then subjected to a stream of water by means of which they are separated from the smaller particles of woody or other foreign matters. For this purpose, also, beaters, hammers, or hand-rolls may be used, thus stamping the fibers, after which they may then be subjected to a stream of water. The wet fibers containing caoutchouc are now taken and subjected to a suitable solvent for caoutchouc. The usual solvents for caoutchouc—turpentine-oil, carbon, disulfid, benzin, &c.—in pure condition will not, however, dissolve the caoutchouc, inasmuch as the same, as well as the fibers, contains water, which will not combine with the solvent. In order to dissolve the caoutchouc with the fibers, I heat turpentine, an alkali lye, sodium or potassium hydrate, which mixture will then dissolve the swelled caoutchouc in the wet fibers after the fibers have remained some time in this mixture. This subjection of the fibers in the solvent may take place in boilers, which may be open or closed by means of steam or direct heat or with or without steam-pressure. After the caoutchouc has been completely dissolved from the fibers and gone into solution with the solvent the fibers are separated from the solvent containing the caoutchouc in solution and pressed between two rolls or subjected to the action of a centrifuge, after which the liquid containing the caoutchouc is collected. This liquid remains undisturbed, during which time the caoutchouc will separate from the liquid and form on the surface of the same, where it may be easily taken off. In case the caoutchouc does not form on the surface I have found it desirable to add some water to the fluid, after which the separation will easily take place. The addition of alum, salt, or diluted acids used in the ordinary process of refining caoutchouc influences the quality of the same, and is for this reason objectionable. The so-obtained caoutchouc is taken off and washed with water and permitted to gradually thicken, after which it is kneaded in a suitable machine and dried or smoked. The fresh and undried caoutchouc contains no substances capable of fermenting as the latex of the other caoutchouc-plants, and can for this reason be kept for a suitable time and be transported in barrels without being subjected to decomposition, for which reason it has special advantages for the manufacture of caoutchouc lacs, varnishes, as well as hard rubber or vulcanized rubber goods, &c., as for these former purposes the dried caoutchouc must first be softened, and for the latter purposes dissolved again. The remaining liquid from which the caoutchouc has been separated may be again used by the addition of a further quantity of solvent, preferably a mixture of a hydrocarbon and an alkali lye. The fibers from which the caoutchouc has been obtained and from which all other substances have been separated are now washed by hand or machine and subjected to a centrifuge or pressed. The as yet wet fibers which are somewhat entangled are separated and loosened from each other and are then dried by means of a suitable machine consisting of a rotating drum provided with teeth. The separation may be more easily accomplished while the fibers are wet, as then they are not easily torn, but drawn out. In a dried condition the fibers would be torn.

The above-described process treats the fibers of plants of the nettle family while still in a fresh or green condition, thereby obtaining the largest amount of caoutchouc from the fibers.

I claim as new and desire to secure by Letters Patent—

1. An art of obtaining rubber from plants of the nettle family, which consists in mechanically separating the bark and thin saps from the fibers while the stalks are in a green state, then subjecting the fibers from which the bark and thin saps have been separated to the action of a solvent for caoutchouc, and then separating the caoutchouc from the solvent.

2. An art of obtaining rubber from plants of the nettle family, which consists in subjecting the stalks of said plants while in a green state to a decorticating operation to eliminate the bark from the fibers, then subjecting the decorticated fibers to a moderate squeezing operation to eliminate the lighter juices and saps therefrom, then subjecting the decorticated and squeezed fibers to the action of a solvent for caoutchouc, and then separating the caoutchouc from the solvent.

3. An art of obtaining rubber from plants of the nettle family, which consists in subjecting the stalks of said plants in a green state to a decorticating operation to eliminate the bark from the fibers, then subjecting the separated fibers to a squeezing operation to eliminate the lighter juices or saps therefrom, then subjecting the squeezed and decorticated fibers to a stream of water for eliminating the smaller particles of wood or other foreign matter, then subjecting the fibers to the action of a caoutchouc solvent, and then separating the caoutchouc from the solvent.

4. An art of obtaining rubber from plants of the nettle family, which consists in mechanically separating the bark and thin saps from the fibers while the stalks are in a green state, then wetting the fibers, then subjecting the wetted fibers to the action of a caoutchouc solvent which dissolves the caoutchouc therefrom, and then separating the caoutchouc from the solvent.

5. An art of obtaining rubber from plants of the nettle family, which consists in subjecting the stalks of said plants while in a green state to a decorticating operation to eliminate the bark from the fibers, then subjecting the decorticated fibers to a moderate squeezing operation to eliminate the thin juices and saps therefrom, then wetting the fibers, then subjecting the wetted fibers to the action of a caoutchouc solvent which dissolves the caoutchouc therefrom, and then separating the caoutchouc from the solvent.

6. An art of obtaining rubber from plants of the nettle family, which consists in mechanically separating the bark and thin saps from the fibers while the stalks are in a green state, then subjecting the fibers from which the bark and thin saps have been separated to the action of a solvent for caoutchouc, and then permitting the mixture to remain undisturbed for a sufficient period for the separation of the caoutchouc from the solvent.

In testimony that I claim the foregoing as my invention I have signed my name in presence of two subscribing witnesses.

GUSTAV HERMANN ROEDER.

Witnesses:
C. P. GOEPEL,
HENRY J. SUHRBIER.